United States Patent [19]
Schneider

[11] 3,729,673
[45] Apr. 24, 1973

[54] CONSTANT VOLTAGE IN VARIED LENGTH CABLES

[75] Inventor: Hans-Dieter Schneider, Gross-Gerau, Germany

[73] Assignee: Fernseh GmbH Darmstadt, Darmstadt, Germany

[22] Filed: Sept. 8, 1971

[21] Appl. No.: 178,565

[30] Foreign Application Priority Data

Sept. 8, 1970 Germany..................P 20 44 329.2

[52] U.S. Cl............323/43.5 S, 178/DIG. 11, 323/87
[51] Int. Cl................................................G05f 1/20
[58] Field of Search.........................323/6, 8, 43.5 S, 323/86, 87, 91; 336/144, 150; 178/DIG. 11; 324/64, 65, 62

[56] References Cited

UNITED STATES PATENTS 3,646,436  2/1972  Chan et al. ............................324/64

Primary Examiner—Gerald Goldberg
Attorney—Carroll B. Quaintance et al.

[57] ABSTRACT

The primary of an AC transformer is connected across a power supply. Two secondaries have opposite ends connected to cable lines. Corresponding taps in the secondary are grounded through controlled switches. Constant current is carried by a third line of the cable. Voltage drop in the third line varies by length. Mutually exclusive threshold switches sense the voltage drop and apply power through a selected impedance transfer to operate one corresponding control switch on each secondary to thereby ground selected points on each secondary, thereby controlling the AC output voltage from the secondaries. Thus the proper AC voltage is applied to the cable according to its length. When no cable is present, no power is available at its connections.

7 Claims, 2 Drawing Figures

Inventor:
Hans-Dieter Schneider 3,729,673

CONSTANT VOLTAGE IN VARIED LENGTH CABLES

BACKGROUND OF THE INVENTION

A circuit automatically keeps constant the operating voltage when cables of different length are used to carry this voltage.

The invention is a circuit arrangement that has the ability to keep constant the AC operating voltage of electrical communications equipment when this AC operating voltage is delivered by a power supply unit and carried to the equipment through cables that may be of different lengths.

When cable is used to carry the AC operating voltage needed by communications equipment (TV cameras, for example), it becomes highly important to compensate for the voltage drop associated with the length of the cable. In the case of TV cameras, the usual method now followed to compensate for the voltage drop caused by the cable length is to employ regulating transformers that can be adjusted as needed. However, this method is expensive. Furthermore, it results in bulky equipment, which runs counter to the present trend of building more and more compact equipment.

Another method employs a single multi-tapped transformer, each tap corresponding to a given cable length. Cables of different lengths can them be connected to the proper tap by means of a manually operated switch. The intrinsic danger here is that of faulty connections resulting in damage to the power source and/or to the TV camera. Another reason rendering this method complicated and unsafe is that the length of the power cable cannot always be ready ascertained.

SUMMARY OF THE INVENTION

The present invention gives a circuit which is able to keep constant the AC operating voltage of a given piece of electrical communications equipment, without the disadvantages mentioned above.

According to the invention, the power supply has a transformer with a primary connected to the AC mains and two identical secondaries tapped at several places. Furthermore, the two extreme ends of the secondaries are connected to two cable lines, and the taps can be grounded through controlling switches. Finally, the switches are governed by an actuating device. This device manipulates the switches according to the length of a third cable line and in such a way that in each case one tap of the first secondary and its corresponding tap in the other secondary become grounded.

The circuit of this invention has the advantage that the power supply gives automatically, and in all cases, the voltage required by the communications equipment, independently of the length of the power cable. This way, the danger of voltage surges that may damage any part of the communications equipment is eliminated. Additionally, this invention has the advantage that when there is an interruption in the cable connections, for instance when cables are changed, the voltage is automatically cut off. This way, the plug connections that normally carry the operating voltage have no potential, and consequently, there is no danger to the personnel operating the equipment.

Furthermore, there is no danger to the communications equipment itself, since instead of the usual voltage surge that normally occurs when there is a cable interruption, there is a complete cut off of voltage.

BRIEF DESCRIPTION OF THE DRAWINGS

A more detailed presentation of the invention follows now, based on FIGS. 1 and 2. It is to be noted that both figures show only those parts that are essential for understanding the function of the automatic voltage regulator invented. Identical parts appearing in both figures bear the same symbols.

DETAILED DESCRIPTION OF THE DRAWING

Figure 1:
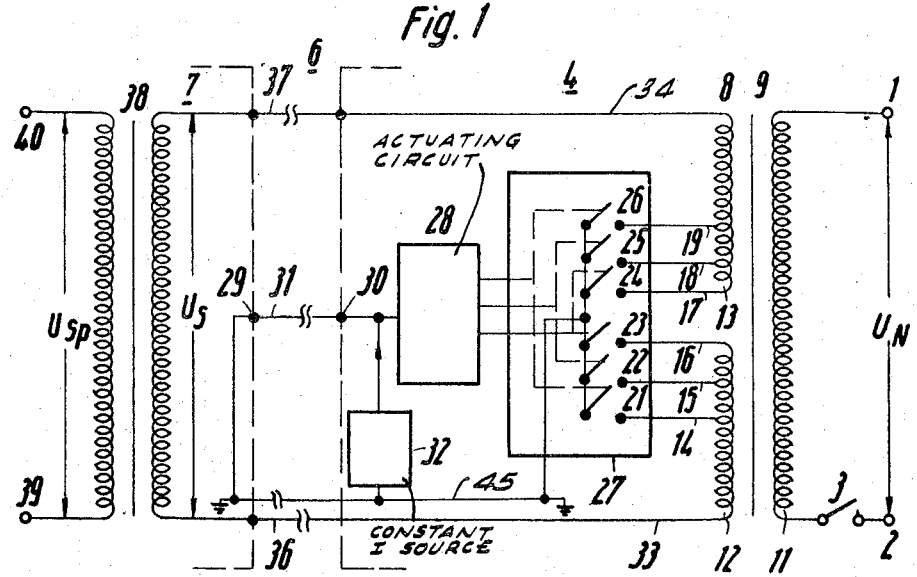
FIG. 1 shows the basic diagram of the circuit according to the invention.

In the circuit shown in FIG. 1, the AC mains are connected at points 1 and 2. When switch 3 of the power supply 4 closes, the AC power is carried by cable 6 to the communication equipment 7, (for instance, a TV camera), whereby the length of the cable 6 is of no importance whatsoever, for the voltage drop in cable 6 is automatically compensated, for. To this end, the secondary 8 of the transformer 9 in the power supply unit 4 is divided into two halves, 12 and 13 respectively, tapped at three places each, 14, 15, 16 and 17, 18, 19, respectively.

The taps can be grounded through the controlled switches 21, 22, 23 and 24, 25, 26. The primary 11 of the transformer is connected to the AC mains $U_N$. Switches 21 to 26 of the switching mechanism 27 are activated by the actuating device 28 according to the length of the cable. Depending on the length of this cable switches 21 and 26, or 22 and 25, or 23 and 24 are closed.

The actuating circuit 28 senses the voltage drop between points 29 and 30 through cable line 31. This voltage drop occurs with the help of a constant current applied by a constant current source 32 from ground to cable branch 31. Because the end 29 of cable 31 located at equipment 7 is grounded, the voltage at point 30 depends solely upon the impedance of line 31, which in turn is a function of the length of line 31 and thus of the length of the cable of which it is a part. From the extreme ends 33 and 34 of the secondaries 12 and 13 comes the desired value of AC voltage $U_S$ for the communications equipment. This voltage is carried symmetrically through the lines 36 and 37 of cable 6. This has the advantage that pickup effects on other lines of cable 6 are avoided. The power supply voltage $U_S$, after transformation through transformer 38, can be used as feed-in voltage for various parts of the communications equipment 7, taken from terminal points 39 and 40.

Figure 2:
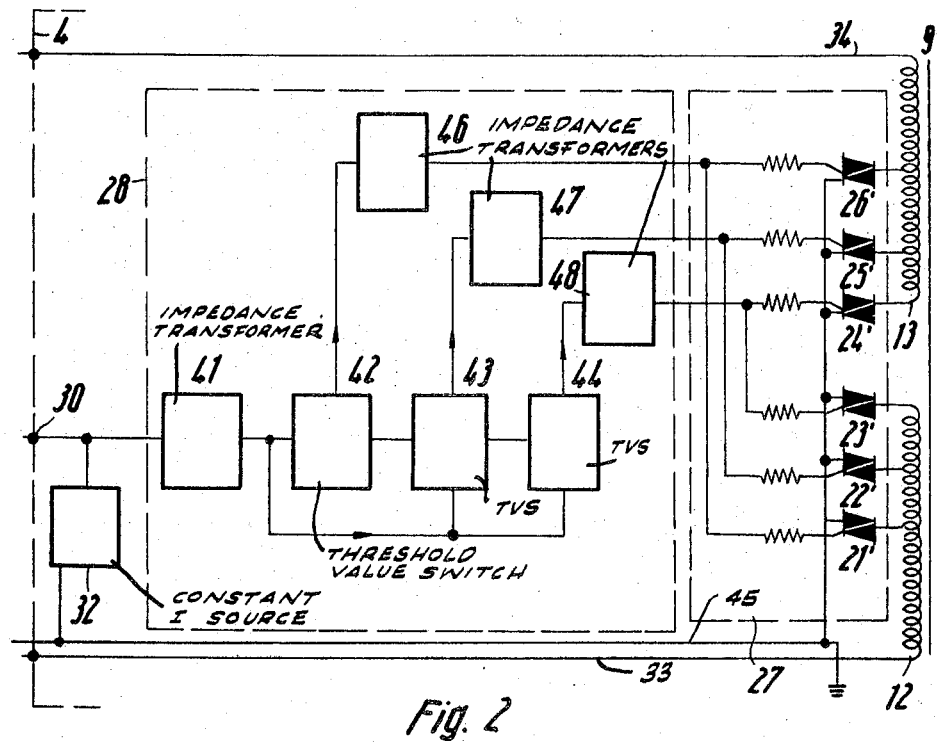
FIG. 2 shows in detail the actuating circuit that controls the switches and the switching mechanism itself.

The actuating equipment 28 shown in FIG. 2 comprises an impedance transformer 41 at whose input the voltage drop occurring in cable line 31 is applied. The output of the impedance transformer 41 is connected to the input of three threshold value switches 42, or 43 or 44, for example of the Schmitt trigger type. The output of these switches is connected through impedance transformer 46 or 47 or 48 to the control electrode of the controlled semiconductors (TRIACS) 21' and 26' or 22' and 25' or 23' and 24'. These controlled semiconductors 21' to 26' operate the controlled switches shown in FIG. 1 between the tapped terminals of the secondaries 12 and 13 and common ground point 45.

Each one of the threshold value switches is equipped with an interlocking switch system and is so built that, depending on the voltage drop in cable 6, only one threshold value switch is driven, and all other threshold value switches are blocked.

Once the threshold value switch that corresponds to a given cable length is driven, it continues operating, even when there are voltage fluctuations, until the next cut off in the cable, for instance when cables are changed. When cable 6 is disconnected, a blocking voltage is applied in the output of the threshold value switches. This blocking voltage renders all these switches inoperative. Consequently, the semiconductor switches 21' to 26' are not conducting, and at the transformer terminals 33 and 34 there is no voltage.

While the invention has been particularly shown and described with reference to a preferred embodiment thereof, it will be understood by those skilled in the art that various changes in form and details may be made therein without departing from the spirit and scope of the invention.

What is claimed is:

1. A circuit for maintaining constant voltage in electrical equipment from a power supply through cables of different lengths comprising:

a transformer having a primary adapted for connection to a power supply, and having two identical secondaries, each having an end adapted for connection to a cable branch, and each secondary having several corresponding taps, a plurality of controlled switches, each switch being connected to a tap and to ground, an actuating control connected to the switches, the control having a voltage sensing means connected to a cable line and to the switches for selecting switches according to voltage at the sensing means.

2. A circuit according to claim 1 wherein the cable has first, second and third lines, wherein the ends of the secondaries are connected to the first and second lines, and wherein the sensing means is connected to the third cable line.

3. A circuit according to claim 1, wherein the switches are controlled semiconductors having power electrodes connected to ground.

4. A circuit according to claim 2, further comprising a constant current source connected to the third cable line.

5. A circuit according to claim 1, in which the voltage sensing means comprises a number of mutually blocking threshold switches connected one after the other, the number of these threshold switches being equal to the number of taps on each one of the secondaries, and each threshold switch being connected to one controlled switch at a tap on one secondary and to another controlled switch at a corresponding tap in the other secondary in such manner as to ground the corresponding taps when the switches are operated.

6. A circuit according to claim 5 wherein the control further comprises a like number of impedance transformers connected to the threshold switches, and wherein an output of each threshold switch is connected through a corresponding impedance transformer to control the electrodes of corresponding controlled switches.

7. A circuit for providing power to electrical equipment via cables of non-predetermined length while delivering the power at a relatively constant voltage, comprising:

A. first and second power delivery lines, each having first and second ends, the first end of each of the first and second lines being connected to said equipment, B. a primary winding of a transformer connectable to an AC power source, C. first and second substantially identical secondary windings of the transformer, one end of each of the first and second windings being connected respectively to the second end of the first and second lines, D. a plurality of taps at equivalent positions on each of the secondary windings, E. switch means for connecting a selected tap from each of the secondary windings to a point of common potential, F. a third line in the cable connected to a point of common potential at said equipment and being connected to a test point at its other end, G. means for applying a current to the test point to generate a test voltage on the third line between the test point and the point of common potential at said equipment, and H. sensing means for measuring the test voltage and for operating the switch means to select the selected tap accordingly.

* * * * *